UNITED STATES PATENT OFFICE 2,658,074

EXTRACTION OF THIOGLYCOLIC ACID FROM ACIDIC AQUEOUS MEDIA

Bryant Charles Fischback, Walnut Creek, and Guy H. Harris, Richmond, Calif., assignors to The Dow Chemical Company, Midland, Mich., a corporation of Delaware No Drawing. Application February 13, 1952, Serial No. 271,422

4 Claims. (Cl. 260—526)

This invention relates to a method for the extraction of thioglycolic acid, $HSCH_2COOH$, from the acidic and saline aqueous medium in which it is found after reaction of sodium hydrosulfide with monochloroacetic acid and acidification with a mineral acid.

The separation of thioglycolic acid from the acidic and saline aqueous medium in which it is formed is a difficult operation which has been the subject of much investigation. Thioglycolic acid is much more soluble in its mother liquor than is thiodiglycolic acid, $S(CH_2COOH)_2$, and methods which have proven useful for the isolation of the latter compound have been unsuccessful with the former. Thus, thiodiglycolic acid can be extracted without chemical change from an acidic saline medium using aldehydes, or ethers, or ketones, or primary alcohols, as is known in the art. However, aldehydes react readily with thioglycolic to form the corresponding mercaptals in the absence of mineral acids or other catalysts; the ethers are poor extractants for thioglycolic acid and are hazardous in commercial operations; ketones react with thioglycolic acid to form mercaptols; and the primary and secondary alcohols react with thioglycolic acid under normal extraction conditions to form esters. The latter reaction is found to occur both when the mother liquor is highly acidic and when no acid is present other than thioglycolic acid. Ester formation, while effective as a means of removing the thioglycolic acid from its mother liquor, is undesirable as a means for recovering the acid because the necessary subsequent saponification reintroduces the problem of separating the desired product from an aqueous saline medium.

It is accordingly a principal object of the present invention to provide a method for the substantially complete separation of pure thioglycolic acid from the aqueous medium in which it is produced, without formation of undesired reaction products such as mercaptals, mercaptols or esters.

It has now been found that the foregoing and related objects may be attained readily, and that substantially pure thioglycolic acid may be obtained directly from aqueous media containing it, without the formation of reaction products such as mercaptals, mercaptols or esters. It has been found, as well, that the desired complete extraction can be effected regardless of the presence of enough mineral acid to favor the undesired ester formation when using other alcoholic extractants. The method of the invention is based on the discovery that saturated tertiary aliphatic alcohols which are substantially immiscible with saline water may be used to extract thioglycolic acid in good yield and in substantial purity from aqueous media containing it. Examples of useful alcohols for this extraction are tertiarybutyl alcohol, tertiaryamyl alcohol, 1,1-dimethyl butanol-1, and 1,1,2-trimethyl propanol-1.

In a specific example, thioglycolic acid was prepared by the reaction of an excess of sodium hydrosulfide on monochloroacetic acid, and the reaction mixture was thereafter acidified to pH of about 1, using hydrochloric acid. There was taken for extraction 1915 ml. of the acidified solution, which was shown by titration with $KI-I_2$ solution to be 1.305 normal in thioglycolic acid. Thus, the sample taken for extraction contained about 230 grams of thioglycolic acid. The 1915 ml. of solution was shaken with 640 ml. of tertiaryamyl alcohol, and the alcoholic extract was separated from the aqueous layer. Titration of an aliquot portion of the extract showed it to contain 142 grams, or about 62 per cent of the thioglycolic acid from the initial charge. The extraction coefficient of tertiaryamyl alcohol in this case is seen to be 4.8, from the equation $$K = \frac{C \text{ alcohol}}{C \text{ water}} = \frac{\frac{142}{640}}{\frac{230-140}{1915}} = 4.8$$

Three additional extractions were made, each using 640 ml. of tertiaryamyl alcohol. The extracts were combined. The residual water layer, after the fourth extraction, contained only 23 milliequivalents, or 2.1 grams, of thioglycolic acid, representing less than 1 per cent of the initial charge. The alcoholic extract was subjected to vacuum distillation to recover the tertiaryamyl alcohol substantially completed. There was obtained over 206 grams of substantially pure thioglycolic acid, representing about 90 per cent of that present in the original charge, as indicated by the titration of original aqueous solution.

In a similar manner, tertiarybutyl alcohol was shown to have an extraction coefficient of 4.4 and 1,1-dimethyl butanol-1 had an extraction coefficient of 2.5, which was higher than that for the aliphatic ethers, esters and chlorinated hydrocarbons tested. Esters, such as butyl acetate, were badly hydrolyzed during attempted extraction. Primary alcohols, such as n-butanol, 2-ethyl hexanol, and the like, were almost completely esterified, even when the reaction product was acidified to a pH of 6. Secondary alcohols, such as di-isopropylcarbinol, methylisobutylcarbinol, and cyclohexanol, had low extraction coefficients and were partially esterified in the course of the extraction, rendering difficult the recovery of the thioglycolic acid. Each extractant was used in portions about one-third the volume of the water layer, and extraction was repeated 4, 6 or 8 or more times as needed to reduce the thioglycolic acid content of the water layer to about 2 per cent of its original value. The commercial mixed amyl alcohols, containing some primary and considerable secondary alcohol was 74 per cent esterified during attempted extraction.

We claim:

1. The method of recovering substantially all of the thioglycolic acid, in substantial purity, from acidified aqueous saline solutions thereof which consists essentially in extracting the thioglycolic acid from said aqueous solution with a member of the group consisting of tertiaryamyl alcohol and tertiarybutyl alcohol, and concentrating the resulting alcoholic solution.

2. The method claimed in claim 1, wherein the alcohol employed is tertiaryamyl alcohol.

3. The method claimed in claim 1, wherein the alcohol employed is tertiarybutyl alcohol.

4. The method claimed in claim 1, wherein the alcoholic solution is concentrated by distilling the alcohol from the thioglycolic acid under reduced pressure.

BRYANT CHARLES FISCHBACK.
GUY H. HARRIS.

References Cited in the file of this patent

UNITED STATES PATENTS

| Number | Name | Date |
|---|---|---|
| 2,425,226 | Bearse | Aug. 5, 1947 |
| 2,594,030 | Coons et al. | Apr. 27, 1952 |

FOREIGN PATENTS

| Number | Country | Date |
|---|---|---|
| 624,568 | Great Britain | June 13, 1949 |